United States Patent Office 3,506,466
Patented Apr. 14, 1970

3,506,466
TITANIUM DIOXIDE PIGMENT HAVING
IMPROVED PIGMENTARY PROPERTIES
Karl-Juergen Bramekamp, Leverkusen, Hans-Hermann
Luginsland, Opladen, and Ingo Stolz, Leverkusen,
Germany, assignors to Titangesellschaft m.b.H.,
Leverkusen, Germany, a corporation of Germany
No Drawing. Filed Apr. 13, 1967, Ser. No. 630,506
Int. Cl. C09c 1/36
U.S. Cl. 106—300                               6 Claims

ABSTRACT OF THE DISCLOSURE

A $TiO_2$ pigment of either anatase or rutile modification with or without a coating of inorganic substances, is treated with a salt of a water-soluble alkanol amine and an oxycarboxylic acid and milled in a fluid energy mill.

CROSS REFERENCE TO RELATED APPLICATION

Germany application No. T 31,126 IVa/22f, filed May 7, 1966.

BACKGROUND OF INVENTION

The invention relates to $TiO_2$ pigment having improved pigmentary properties in coating compositions; and to a method of making same by treating a $TiO_2$ pigment with organic treating agents; and appears to be the subject of chemical patents relating specifically to titanium dioxide.

It is known in the art to subject titanium dioxide pigments to treatment with organic substances in order to improve certain pigmentary properties of the pigments such as, for example, their wetting properties and dispersibility in organic media; or their stability towards settling in liquid media. Such treatments, however, frequently impair other properties of the pigments, e.g., the brightness, tinting strength and rheological properties of the coating systems produced therefrom. Furthermore, varnishes that contain pigments treated with organic substances have a tendency to yellow on baking.

In the German published specification No. 1,191,504 there is described a process according to which a water-soluble salt of a tertiary amine, e.g. of triethanol amine with an organic acid which has a solubility between 0.05% and 2.0% by weight in water at 20° C. is absorbed on titanium dioxide particles, whereupon the pigment is dried and subjected to jet milling. It is alleged that by this treatment the dispersibility of the pigment is improved while other physical properties are not affected. According to this disclosure the solubility range of the acid components of the amine salts is critical since a pigment that has been treated with amine salts of organic acids having solubilities outside the range stated are alleged to be neither easily dispersible in organic media nor in aqueous media.

SUMMARY OF INVENTION

A new process for the manufacture of a titanium dioxide pigment has now been found which has not only outstanding dispersibility but, beyond that, possesses considerable improvement in other properties, e.g., tinting strength and scattering coefficient. According to this process a titanium dioxide pigment manufactured by any known process, and preferably coated with inorganic substances, is treated with an organic material, in an aqueous slurry subsequently dried and finally subjected to fluid energy milling.

DESCRIPTION OF PREFERRED EMBODIMENT

The process is characterized in that the organic material used is a salt of an alkanol amine and an oxycarboxylic acid, wherein the alkanol amine does not contain any radicals bound to nitrogen with more than 5 carbon atoms and the oxycarboxylic acid does not contain more than 5 carbon atoms, besides one or more carboxyl groups. The acid components of the alkanol-ammonium salts employed in the application, according to the invention, are easily soluble in water. It has been found, surprisingly, that in contrast to the statements in the German specification No. 1,191,504 the pigments treated according to the present invention have not only an outstanding dispersibility in aqueous and organic media, but are also improved beyond that in other respects. For example, they show, in varnishes, improvement in tinting strength, in scattering power, in the spectral difference of scattering and in gloss. At the same time no brightness impairment occurs due to the treatment according to the invention.

The process according to the invention is applicable to rutile as well as to anatase pigment.

According to the invention both the treatment with the organic material as well as the final fluid energy milling i.e. jet milling of the dried pigment, are essential for the efficiency of the process.

Examples of the alkanolamine components are, among others, triethanolamine, butyldiethanolamine, triisopropanolamine, tris(hydroxymethyl)aminomethane. As acid components oxycarboxylic acids with one or more carboxyl groups and one or more hydroxy groups, i.e., lactic acid, citric acid, malic acid, tartaric acid, glycolic acid may be employed. Either individual salts alone or mixtures of a number of such salts may be employed.

The use of triethanol ammonium lactate is particularly expedient for carrying out the process according to the invention. By means of this substance not only is an optimum improvement of the optical characteristics and the dispersibility achieved, but pigments treated with triethanol ammonium lactate have a relatively slight drying time retardation in air drying varnishes, as compared with pigments treated with several other organic substances.

The treatment of the titanium dioxide pigment with the alkanol ammonium salts is carried out in such a way that the alkanol ammonium salt is added, in pure form or preferably dissolved in water or in an organic solvent, to an aqueous slurry of the pigment. It would also be possible to spray the organic substance or its solution into the dry pigment; however, in this case the results are not so satisfactory as when adding it to the aqueous slurry. After adding the alkanol ammonium salts the slurry is dried. The drying may be carried out in any desired manner, for example, in a drying oven at normal or reduced pressure. It is particularly advantageous to dry the slurry in an atomizing drier. The dried titanium dioxide pigment is subsequently milled in a jet mill.

Titanium dioxide pigment manufactured by any process may be subjected to the process according to the invention. The pigment may be produced according to the most divergent processes as, for example, according to the so-called sulfate process or the chloride process. In order to combine the improvements obtainable by the process according to this invention with the improvements known as such, which may be obtained by a treatment of the titanium dioxide pigment with inorganic substances, the titanium dioxide particles are preferably, in the manner known as such, coated once or several times with inorganic substances, for example, oxides or hydrated oxides prior to being subjected to the process according to the invention. It is particularly favorable to mix the titanium dioxide pigment in aqueous slurry with water-soluble metal salts and/or a water soluble silicate, to precipitate the hydrated oxides or other difficultly soluble compounds of the metal salts onto the pigment, to separate and wash the pigment, to add immediately afterwards the alkanol ammonium salt to the paste, diluted again if necessary, and then dry the latter and subject it to jet milling. The pigment treated with the inorganic substances may, on the other hand, also be dried and, as the case may be, calcined and/or milled before it is again slurried, wet milled and/or classified, if desired, and then subjected to the treatment according to the invention.

The alkanol ammonium salt needs only to be added in slight amounts. Even when using as little as 0.1% on a pigment bases, an improvement of the pigment is obtained. There is no sharp upper limit in the amount of alkanol ammonium salt used but ordinarily no more than 1% on the basis of pigment used will be employed.

The following examples will explain the invention somewhat in more detail. The following properties of the treated pigments will be tested by the methods described below:

TESTS

Tinting strength

The determination is carried out according to "Official Digest," Federation of Societies for Paint Technology, July 1962, "Reflectometry Method for Measuring Tinting Strength of White Pigments," pp. 704–715, particularly pp. 712–713.

Scattering coefficient

The determination was carried out according to "Farbe u. Lack" 71, No. 8, 1965, pp. 632–643, particularly pp. 638–640; the pigment volume concentration was 20%.

Dispersibility

This was determined as follows: A milling batch consisting of 300 g. of the pigment to be examined, 100 g. of a medium oil soya alkyd vehicle and 75 g. mineral spirits was prepared and stirred in a stirring disc device at 1900 r.p.m. 3, 18 and 30 minutes after the addition of all substances a sample is taken in each case and tested according to the Hegman method (H. A. Gardner and G. G. Sward, Paint Testing Manual, Physical and Chemical Examination of Paints, Varnishes, Lacquers and Colors, 12th edition, 1962, p. 243).

The results of the tests are summarized in a table subsequent to the description of the examples.

EXAMPLE 1

A rutile pigment was mixed in an aqueous slurry with sodium silicate in an amount of 1.8% calculated as $SiO_2$ and aluminum sulfate in an amount of 2.1% calculated as $Al_2O_3$ (both additions referring to weight of $TiO_2$ used) and subsequently ammonia was added up to a pH of 8.1. The pigment thus obtained was filtered and washed repeatedly with demineralized water. The pulp thus obtained, which contained 100 kg. pigment, was slurried with enough demineralized water so that it showed a solids content of 50%. To this slurry was added 1 liter of a solution containing 500 g.p.l. triethanol ammonium lactate corresponding to 0.5% triethanol ammonium lactate, in reference to the pigment used. After addition, stirring was continued for 1 hour and the suspension was subsequently put through an atomizing i.e. spray drier. The throughput was 50–60 kg. pigment per hr. The gas exit temperature was 110° C. Subsequently the pigment was milled in a jet mill.

EXAMPLE 1a

Example 1 was repeated with the difference that no triethanol ammonium lactate was added. In all properties tested the pigment thus obtained showed results inferior to the pigment manufactured according to Example 1.

When a rutile pigment post-treated with triethanol ammonium lactate as in Example 1 is milled by means other than a jet mill, for example, a two-jaw mill, there is obtained a product that is much inferior, especially as far as dispersibility is concerned, to a product made according to the process of this invention.

EXAMPLE 2

Example 1 was repeated with the difference that instead of triethanol ammonium lactate, butyl diethanol ammonium citrate was employed. This substance was added in the form of an aqueous solution having a content of 500 g.p.l., wherein the amount of butyl diethanol ammonium citrate was 0.5% in reference to the pigment employed.

EXAMPLES 3 AND 4

The procedure was the same as in Example 1. Instead of triethanol ammonium lactate, triethanol ammonium diglycolate and tris(hydroxymethyl)aminomethane lactate were employed.

EXAMPLE 5

A rutile pigment was post-treated with inorganic substances in a manner similar to that of Example 1, wherein as post-treatment substances titanyl sulfate in an amount of 1%, calculated as $TiO_2$, and aluminum sulfate in an amount of 3%, calculated as $Al_2O_3$, were used, both amounts referring to pigment employed. 100 kg. of the pigment post-treated in this manner was masticated in the form of a paste containing 55% solids, with 0.5 kg. triethanol ammonium lactate for one hour. Subsequently the slurry was dried for 10 hours in a drying oven at 90° C. at a reduced pressure of 300 torr. Subsequently the pigment was milled in a jet mill as in Example 1.

EXAMPLE 6

An anatase pigment was post-treated, as in Example 5, with 1% titanyl sulfate, calculated as $TiO_2$, and 3% aluminum sulfate, calculated as $Al_2O_3$. The pigment thus obtained was treated as in Example 1 with 0.5% triethanol-ammonium lactate, dried in an atomizing i.e. spray drier and milled in a jet mill.

TABLE

| Pigment Example | Modification | Inorganic Post-Treatment | Organic Post-Treatment | Method of Drying |
| --- | --- | --- | --- | --- |
| 1 | Rutile | 1.8% $SiO_2$, 2.1% $Al_2O_3$ | 0.5% TAL | Atomizing, i.e., spray drying. |
| 1a | do | 2.1% $Al_2O_3$, 1.8% $SiO_2$ | | Do. |
| 2 | do | 2.1% $Al_2O_3$, 1.8% $SiO_2$ | 0.5% BDAC | Do. |
| 3 | do | 2.1% $Al_2O_3$, 1.8% $SiO_2$ | 0.5% TADG | Do. |
| 4 | do | 2.1% $Al_2O_3$, 1.8% $SiO_2$ | 0.5% TAML | Do. |
| 5 | do | 1.0% $TiO_2$, 3.0% $Al_2O_3$ | 0.5% TAL | drying oven. |
| 6 | Anatase | 1.0% $TiO_2$, 3.0% $Al_2O_3$ | 0.5% TAL | Atomizing, i.e., spray drying. |

| Example Pigment | Tinting Strength | Scattering Coefficient | Dispersibility 3 min. | 18 min. | 30 min. |
| --- | --- | --- | --- | --- | --- |
| 1 | 1,870 | 265 | 1.5 | 3.5 | 4.0 |
| 1a | 1,630 | 236 | 0.0 | 0.0 | 1.0 |
| 2 | 1,875 | 249 | 0.5 | 1.0 | 2.5 |
| 3 | 1,835 | 251 | 0.5 | 2.5 | 3.0 |
| 4 | 1,855 | 256 | 1.5 | 3.5 | 4.5 |
| 5 | 1,875 | (¹) | 1.0 | 3.0 | 4.0 |
| 6 | 1,400 | (¹) | 2.0 | 4.5 | 5.5 |

¹ Not determined.
TAL—Triethanol ammonium lactate; BDAC—Butyl Diethanol ammonium citrate, TADG—Triethanol Ammonium diglycolate; TAML—Tris(hydroxymethyl)- amino-methane-lactate.

While this invention has been described and illustrated by the examples shown, other variations and modifications may be employed within the scope of the following claims.

We claim:
1. A TiO$_2$ pigment having improved pigmentary properties in coating compositions comprising pigmentary TiO$_2$ having a coating thereon comprising a hydrated oxide selected from the group consisting of alumina, titania, silica and mixtures thereof in amounts from 1.0 to 3.0% on a TiO$_2$ pigment basis and an organic material in amounts from about 0.1 to about 1.0% on a TiO$_2$ pigment basis, said organic material comprising a salt of a water soluble alkanol amine and an easily water-soluble oxycarboxylic acid said alkanol amine being selected from the group consisting of triethanolamine, butyldiethanolamine, triisopropanolamine and tris(hydroxymethyl) aminomethane and the easily water-soluble oxycarboxylic acid being selected from the group consisting of lactic, citric, malic, tartaric and glycolic acids.
2. A TiO$_2$ pigment having improved pigmentary properties according to claim 1 wherein said hydrated oxide coating comprises silica and alumina and said organic material is triethanol ammonium lactate.
3. A TiO$_2$ pigment having improved pigmentary properties in coating composition according to claim 1 wherein said hydrated oxide coating comprises silica and alumina and said organic material is butyl diethanol ammonium citrate.
4. A TiO$_2$ pigment having improved pigmentary properties in coating compositions according to claim 1 wherein said hydrated oxide coating comprises silica and alumina and said organic material is triethanol ammonium diglycolate.
5. A TiO$_2$ pigment having improved pigmentary properties in coating compositions according to claim 1 wherein said hydrated oxide coating comprises silica and alumina and said organic material is tris(hydroxymethyl) aminomethane-lactate.
6. A TiO$_2$ pigment having improved pigmentary properties according to claim 1 wherein said hydrated oxide coating comprises titania and alumina and said organic material is triethanol ammonium lactate.

References Cited

UNITED STATES PATENTS

| | | | |
|---|---|---|---|
| 2,721,787 | 10/1955 | Hettrick | 23—202 |
| 3,316,204 | 4/1967 | Lederer | 106—300 XR |
| 3,418,147 | 12/1968 | Fields | 106—308 |
| 2,744,029 | 5/1956 | Kingsbury | 106—300 |
| 2,819,174 | 1/1958 | Vartanian | 106—300 |
| 3,015,573 | 1/1962 | Myers et al. | 106—300 |
| 3,172,772 | 3/1965 | Rowe | 106—300 |
| 3,332,793 | 7/1967 | Dreher. | |
| 3,345,187 | 10/1967 | Binnis. | |
| 3,412,944 | 11/1968 | Wollenberg | 106—300 XR |

TOBIAS E. LEVOW, Primary Examiner

H. M. S. SNEED, Assistant Examiner

U.S. Cl. X.R.

106—308; 260—40